US009122499B2

(12) United States Patent
Bittner et al.

(10) Patent No.: US 9,122,499 B2
(45) Date of Patent: Sep. 1, 2015

(54) REAL TIME EXAMINATION OF CONDITIONS OF PHYSICAL MACHINES USING AUGMENTED REALITY IN SMARTER DATA CENTER

(75) Inventors: William K Bittner, Westford, MA (US); Ann M Funai, Austin, TX (US); Scott L Winters, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 461 days.

(21) Appl. No.: 13/534,619

(22) Filed: Jun. 27, 2012

(65) Prior Publication Data

US 2014/0006590 A1 Jan. 2, 2014

(51) Int. Cl.
*G06F 15/173* (2006.01)
*G06F 9/445* (2006.01)
*G06F 11/30* (2006.01)
*G06F 11/32* (2006.01)

(52) U.S. Cl.
CPC ........ *G06F 9/44505* (2013.01); *G06F 11/3003* (2013.01); *G06F 11/328* (2013.01); *G06F 11/3055* (2013.01); *G06F 2201/865* (2013.01)

(58) Field of Classification Search
USPC .......................... 709/201–224, 200; 345/629
See application file for complete search history.

(56) References Cited

U.S. PATENT DOCUMENTS

| 6,877,661 | B2 | 4/2005 | Webb et al. |
| 2006/0017562 | A1 | 1/2006 | Bachelder |
| 2007/0011186 | A1 | 1/2007 | Horner et al. |
| 2011/0235577 | A1 | 9/2011 | Hintermeister et al. |
| 2012/0005344 | A1 | 1/2012 | Kolin et al. |
| 2012/0026530 | A1* | 2/2012 | Tsongas et al. ............. 358/1.14 |
| 2013/0031202 | A1* | 1/2013 | Mick et al. .................... 709/217 |

FOREIGN PATENT DOCUMENTS

| CN | 1508689 A | 6/2004 |
| CN | 101231609 A | 7/2008 |

OTHER PUBLICATIONS

International Search Report and Written Opinion for PCT Application No. PCT/CN2013/073995, mailed Jul. 11, 2013.

* cited by examiner

*Primary Examiner* — El Hadji Sall
(74) *Attorney, Agent, or Firm* — Terrile, Cannatti, Chambers & Holland, LLP; Stephen A. Terrile

(57) ABSTRACT

A system for facilitating examination of conditions across physical machines using augmented reality generates an overlay of information about application structure across physical systems, such as physical systems located within a data center. Additionally, the system for facilitating examination of application structure across physical machines using augmented reality overlays this information about application structure using imaging captured through a camera, such as a camera associated with a tablet type or smart phone type computing device.

10 Claims, 4 Drawing Sheets

REAL TIME EXAMINATION OF CONDITIONS OF PHYSICAL MACHINES USING AUGMENTED REALITY IN SMARTER DATA CENTER

BACKGROUND

1. Field

The present disclosure relates in general to the field of computers and similar technologies, and in particular to software utilized in this field. Still more particularly, the present disclosure relates to real time examination of conditions across physical machines using augmented reality.

2. Description of the Related Art

With the explosive growth in the use of computers to host business applications, Internet Websites, etc., a need to build bigger data centers to house computers and related hardware has also grown exponentially. Data centers (also known as "server farms") can house thousands of computers and related equipments such as networking gears, etc. A data center or a server farm is a facility to house a number of computer systems and related equipment. For example, a business organization may house all or some of their computer servers (i.e., hosts) at one physical location to manage these computer servers efficiently. The computer servers in a data center are typically coupled to users of the computer servers via the Internet or Wide Area Network (WAN) or Local Area Network (LAN) or any other similar type of medium. These computer servers are often used to host critical business applications. Because the business operations of these business organizations critically depend on the continuous availability of the computer servers, special attention is often paid to manage data centers to prevent or minimize server down times. Information technology (IT) management of the computing resources in a data center is important for ensuring high availability of computing resources.

One issue relating to data centers is that IT support personnel do not necessarily have knowledge of which application are executing on particular devices within the data center. In certain known data centers, the support personnel might be provided with access to a static operations dashboard to obtain information relating to this type of data. Additionally, in certain know data centers, the IT support personnel examine conditions via a Graphical User Interface (GUI) or Command Line Interface (CLI). Additionally, data center IT personnel such as IT architects and managers may not have any knowledge of what application stacks have been dispatched to physical machines in a virtualized or physical mode as they view the physical machines racked in the data center.

SUMMARY

The present disclosure includes, but is not limited to, a method, system and computer-usable medium for facilitating examination of conditions across physical machines using augmented reality.

More specifically in various embodiments, the system for facilitating examination of conditions across physical machines using augmented reality generates an overlay of information about conditions across physical systems, such as physical systems located within a data center. Additionally, the system for facilitating examination of conditions across physical machines using augmented reality overlays this information about conditions using imaging captured through a camera, such as a camera associated with a tablet type or smart phone type computing device. Additionally, the system for facilitating examination of conditions across physical machines using augmented reality displays the information about the conditions along with the associated physical systems via a display of the tablet type or smart phone type computing device. In certain embodiments, the imaging can be in real time. When an IT support personnel is actually viewing a device or a plurality of devices within a data center, an image of the device or devices is easily obtained and displayed via the display device along with information about the conditions of the physical systems being viewed, with the overlay of the information displayed. The combination of the image of the physical device along with the information about the conditions of the physical systems is referred to as an augmented reality of the physical systems. Thus, the IT support personnel can approach a physical device or a plurality of physical devices and obtain detailed information about the physical system and conditions. Such a system provides a naturally intuitive system which allows the IT personnel to monitor the system.

Additionally, in certain embodiments, the system for facilitating examination of conditions across physical machines using augmented reality defines presentation of the software stacks that are currently executing on the physical hardware in a virtualized and/or cloud computing environment. Additionally, in certain embodiments, the system for facilitating examination of conditions across physical machines using augmented reality defines presentation of information regarding a physical installed hardware environment. Additionally, in certain embodiments, the computing device continuously obtains information about the physical devices while in proximity with the physical device to which the camera is directed. Additionally, in certain embodiments, the computing device then identifies the physical machine being viewed via a unique identifier (ID) of the physical device such as a quick response (QR) type code which is visible on the physical machine. The system for facilitating examination of conditions across physical machines using augmented reality then accesses monitoring software, and obtains data about the status of the physical device, the applications executing on the physical device, and the status of those applications. Additionally, in certain embodiments, the physical device being viewed is an officially registered end point of the data center pool of assets so that the information associated with the physical device can be obtained regarding internal software stacks. The system for facilitating examination of conditions across physical machines using augmented reality then uses this information to render an overlay over the image of whatever is being observed via the computing device and displays the data that was obtained The above, as well as additional purposes, features, and advantages of the present disclosure will become apparent in the following detailed written description.

BRIEF DESCRIPTION OF THE DRAWINGS

Selected embodiments of the present disclosure may be understood, and its numerous objects, features and advantages obtained, when the following detailed description is considered in conjunction with the following drawings, in which.

DETAILED DESCRIPTION

Figure 1:
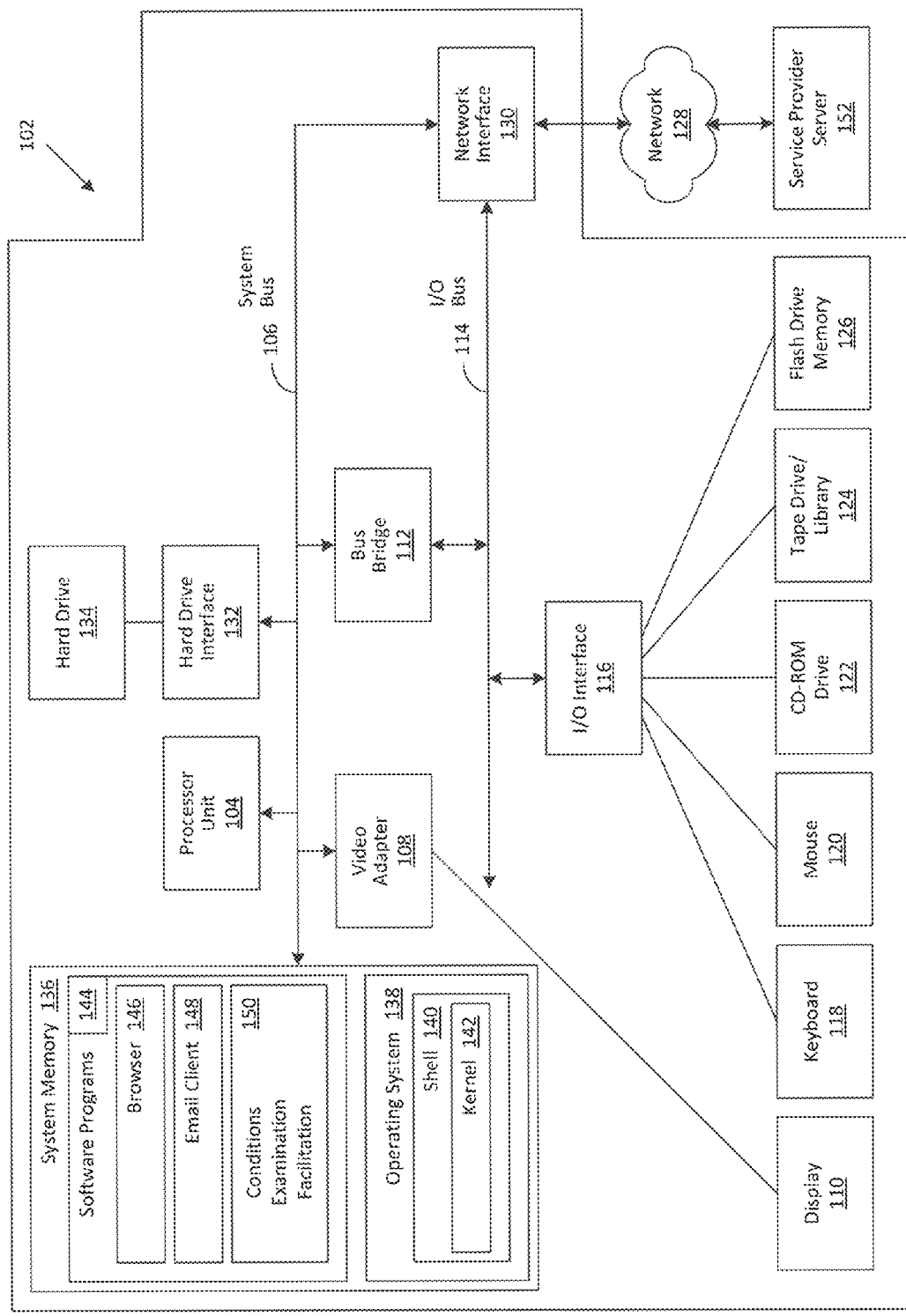
FIG. 1 shows an exemplary data processing system in which the present disclosure may be implemented.

A method, system and computer-usable medium are disclosed for facilitating examination of conditions across physical machines using augmented reality. As will be appreciated by one skilled in the art, the present disclosure may be embodied as a method, system, or computer program product. Accordingly, embodiments of the disclosure may be implemented entirely in hardware, entirely in software (including firmware, resident software, micro-code, etc.) or in an embodiment combining software and hardware. These various embodiments may all generally be referred to herein as a "circuit," "module," or "system," Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example, hut not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. In the context of this document, a computer-usable or computer-readable medium may be any medium that can contain, store, communicate, propagate, or transport the program for use by or in connection with the instruction execution system, apparatus, or device. The computer usable program code may be transmitted using any appropriate medium, including but not limited to the Internet, wireline, optical fiber cable, radio frequency (RF), etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is a block diagram of an exemplary data processing system 102 in which the present disclosure may be utilized. The data processing system 102 includes a processor unit 104 that is coupled to a system bus 106. A video adapter 108, which controls a display 110, is also coupled to system bus 106. System bus 106 is coupled via a bus bridge 112 to an Input/Output (I/O) bus 114. An I/O interface 116 is coupled to I/O bus 114. The I/O interface 116 affords communication with various I/O devices, including a keyboard 118, a mouse 120, a Compact Disk-Read Only Memory (CD-ROM) drive 122, a floppy disk drive 124, and a flash drive memory 126. The format of the ports connected to I/O interface 116 may be any known to those skilled in the art of computer architecture, including but not limited to Universal Serial Bus (USB) ports.

Data processing system 102 is able to communicate with a service provider server 152 via a network 128 using a network interface 130, which is coupled to system bus 106. Network 128 may be an external network such as the Internet, or an internal network such as an Ethernet Network or a Virtual Private Network (VPN). Using network 128, client data processing system 102 is able to use the present disclosure to access service provider server 152.

A hard drive interface 132 is also coupled to system bus 106. Hard drive interface 132 interfaces with a hard drive 134. In a preferred embodiment, hard drive 134 populates a system memory 136, which is also coupled to system bus 106. Data that populates system memory 136 includes an operating system 138 and software programs 144 of the data processing system 102.

OS 138 includes a shell 140 for providing transparent user access to resources such as software programs 144. Generally, shell 140 is a program that provides an interpreter and an interface between the user and the operating system. More specifically, shell 140 executes commands that are entered into a command line user interface or from a file. Thus, shell 140 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. While shell 140 generally is a text-based, line-oriented user interface, the present disclosure can also support other user interface modes, such as graphical, voice, gestural, etc.

As depicted, OS 138 also includes kernel 142, which includes lower levels of functionality for OS 138, including essential services required by other parts of OS 138 and software programs 144, including memory management, process and task management, disk management, and mouse and keyboard management.

Software programs 144 may include a browser 146 and email client 148. Browser 146 includes program modules and instructions enabling a World Wide Web (WWW) client (i.e., client data processing system 102) to send and receive network messages to the Internet using HyperText Transfer Protocol (HTTP) messaging, thus enabling communication with service provider server 152. Software programs 144 also include a conditions examination facilitation module 150. The conditions examination facilitation module 150 includes code for implementing the processes described in FIGS. 2 through 5 described hereinbelow. In one embodiment, data processing system 102 is able to download the conditions examination facilitation module 150 from a service provider server 152.

The conditions examination facilitation module 150 generates an overlay of information about conditions across physical systems, such as physical systems located within a data center. Additionally, the conditions examination facilitation module 150 overlays this information about conditions using imaging captured through a camera, such as a camera associated with a tablet type or smart phone type data processing system. Additionally, the conditions examination facilitation module 150 displays the information about the conditions along with the associated physical systems via a display of the tablet type or smart phone type computing device. In certain embodiments, the imaging can be in real time. When an IT support personnel is actually viewing a device or a plurality of devices within a data center, an image of the device or devices is easily obtained and displayed via the display device along with information about the conditions of the physical systems being viewed, with the overlay of the information displayed. The combination of the image of the physical device along with the information about the conditions of the physical systems is referred to as an augmented reality of the physical systems. Thus, the IT support personnel can approach a physical device or a plurality of physical devices and obtain detailed information about the physical system and conditions. Such a system provides a naturally intuitive system which allows the IT personnel to monitor the system.

The hardware elements depicted in data processing system 102 are not intended to be exhaustive, but rather are representative to highlight components used by the present disclosure. For instance, data processing system 102 may include alternate memory storage devices such as magnetic cassettes, Digital Versatile Disks (DVDs), Bernoulli cartridges, and the like. These and other variations are intended to be within the spirit and scope of the present disclosure.

Figure 2:
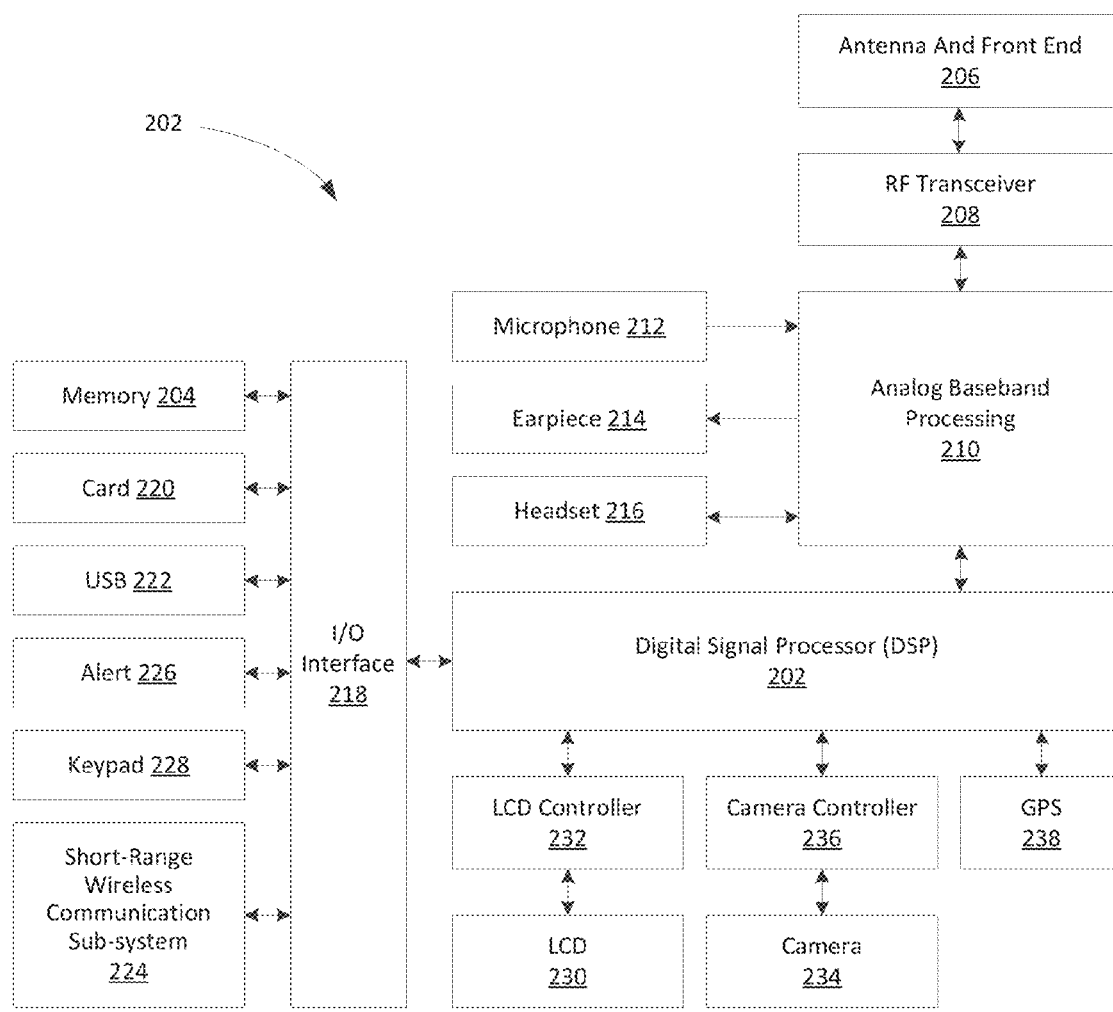
FIG. 2 shows a block diagram of a smart phone or tablet type data processing system.

FIG. 2 shows a block diagram of an exemplary tablet or smart phone type data processing system also sometimes referred to as a client node. While various components of a client node are shown, various embodiments of the client node may include a subset of the listed components or additional components not listed. As shown in FIG. 2, the client node 202 includes a DSP 202 and a memory 204. As shown, the client node 202 may further include an antenna and front end unit 206, a radio frequency (RF) transceiver 208, an analog baseband processing unit 210, a microphone 212, an earpiece speaker 214, a headset port 216, a bus 218, such as a system bus or an input/output (I/O) interface bus, a removable memory card 220, a universal serial bus (USB) port 222, a short range wireless communication sub-system 224, an alert 226, a keypad 228, a liquid crystal display (LCD) 230, which may include a touch sensitive surface, an LCD controller 232, a charge-coupled device (CCD) camera 234, a camera controller 236, and a global positioning system (GPS) sensor 238, and a power management module 240 operably coupled to a power storage unit, such as a battery 242. In various embodiments, the client node 202 may include another kind of display that does not provide a touch sensitive screen. In one embodiment, the DSP 202 communicates directly with the memory 204 without passing through the input/output interface 218.

In various embodiments, the DSP 202 or some other form of controller or central processing unit (CPU) operates to control the various components of the client node 202 in accordance with embedded software or firmware stored in memory 204 or stored in memory contained within the DSP 202 itself. In addition to the embedded software or firmware, the DSP 202 may execute other applications stored in the memory 204 or made available via information carrier media such as portable data storage media like the removable memory card 220 or via wired or wireless network communications. The application software may comprise a compiled set of machine-readable instructions that configure the DSP 202 to provide the desired functionality, or the application software may be high-level software instructions to be processed by an interpreter or compiler to indirectly configure the DSP 202.

The antenna and front end unit 206 may be provided to convert between wireless signals and electrical signals, enabling the client node 202 to send and receive information from a cellular network or some other available wireless communications network or from a peer client node 202. In an embodiment, the antenna and front end unit 106 may include multiple antennas to support beam forming and/or multiple input multiple output (MIMO) operations. As is known to those skilled in the art, MIMO operations may provide spatial diversity which can be used to overcome difficult channel conditions or to increase channel throughput. Likewise, the antenna and front end unit 206 may include antenna timing or impedance matching components, RF power amplifiers, or low noise amplifiers.

In various embodiments, the RF transceiver 208 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 210 or the DSP 202 or other central processing unit. In some embodiments, the RF Transceiver, portions of the Antenna and Front End 206, and the analog base band processing unit 210 may be combined in one or more processing units and/or application specific integrated circuits (ASICs).

The analog baseband processing unit 210 may provide various analog processing of inputs and outputs, for example analog processing of inputs from the microphone 212 and the headset 216 and outputs to the earpiece 214 and the headset 216. To that end, the analog baseband processing unit 210 may have ports for connecting to the built-in microphone 212 and the earpiece speaker 214 that enable the client node 202 to be used as a cell phone. The analog baseband processing unit 210 may further include a port for connecting to a headset or other hands-free microphone and speaker configuration. The analog baseband processing unit 210 may provide digital-to-analog conversion in one signal direction and analog-to-digital conversion in the opposing signal direction. In various embodiments, at least some of the functionality of the analog baseband processing unit 210 may be provided by digital processing components, for example by the DSP 202 or by other central processing units.

The DSP 202 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, tier example in a code division multiple access (CDMA) technology application, for a transmitter function the DSP 202 may perform modulation, coding, interleaving, and spreading, and for a receiver function the DSP 202 may perform despreading, deinterleaving, decoding, and demodulation. In another embodiment, for example in an orthogonal frequency division multiplex access (OFDMA) technology application, for the transmitter function the DSP 202 may perform modulation, coding, interleaving, inverse fast Fourier transforming, and cyclic prefix appending, and for a receiver function the DSP 202 may perform cyclic prefix removal, fast Fourier transforming, deinterleaving, decoding, and demodulation. In other wireless technology applications, yet other signal processing functions and combinations of signal processing functions may be performed by the DSP 202.

The DSP 202 may communicate with a wireless network via the analog baseband processing unit 210. In some embodiments, the communication may provide Internet connectivity, enabling a user to gain access to content on the Internet and to send and receive email or text messages. The input/output interface 218 interconnects the DSP 202 and various memories and interfaces. The memory 204 and the removable memory card 220 may provide software and data to configure the operation of the DSP 202. Among the interfaces may be the USB interface 222 and the short range wireless communication sub-system 224. The USB interface 222 may be used to charge the client node 202 and may also enable the client node 202 to function as a peripheral device to exchange information with a personal computer or other computer system. The short range wireless communication sub-system 224 may include an infrared port, a Bluetooth interface, an IEEE 802.11 compliant wireless interface, or any other short range wireless communication sub-system, which may enable the client node 202 to communicate wirelessly with other nearby client nodes and access nodes.

The input/output interface 218 may further connect the DSP 202 to the alert 226 that, when triggered, causes the client node 202 to provide a notice to the user, for example, by ringing, playing a melody, or vibrating. The alert 226 may serve as a mechanism for alerting the user to any of various events such as an incoming call, a new text message, and an appointment reminder by silently vibrating, or by playing a specific pre-assigned melody for a particular caller.

The keypad 228 couples to the DSP 202 via the I/O interface 218 to provide one mechanism for the user to make selections, enter information, and otherwise provide input to the client node 202. The keyboard 228 may be a full or reduced alphanumeric keyboard such as QWERTY, Dvorak, AZERTY and sequential types, or a traditional numeric keypad with alphabet letters associated with a telephone keypad. The input keys may likewise include a trackwheel, an exit or escape key, a trackball, and other navigational or functional keys, which may be inwardly depressed to provide further input function. Another input mechanism may be the LCD 230, which may include touch screen capability and also display text and/or graphics to the user. The LCD controller 232 couples the DSP 202 to the LCD 230.

The camera 234, if equipped, enables the client node 202 to take digital pictures. The DSP 202 communicates with the camera 234 via the camera controller 236. In certain embodiments, a camera operating according to a technology such as Charge Coupled Device (CCD) cameras may be employed. The GPS sensor 238 is coupled to the DSP 202 to decode global positioning system signals or other navigational signals, thereby enabling the client node 202 to determine its position. Various other peripherals may also be included to provide additional functions, such as radio and television reception.

Figure 3:
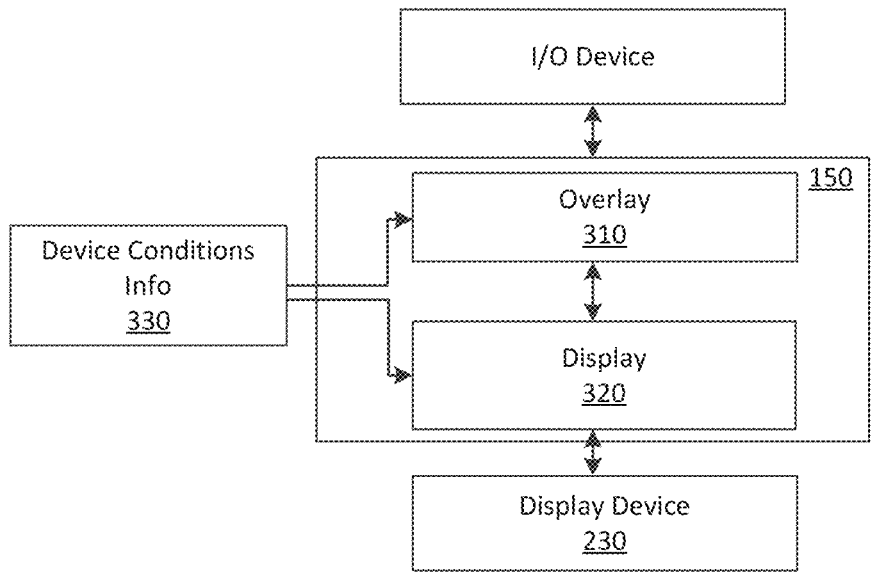
FIG. 3 shows a block diagram of a system for facilitating examination of conditions across physical machines using augmented reality.

Referring to FIG. 3, a block diagram of a conditions examination facilitation module 150 is shown. More specifically a conditions examination facilitation module 150 includes an overlay module 310 which generates an overlay of information about conditions across physical systems, such as physical systems located within a data center. The overlay module obtains information in real time about a physical device or devices via an I/O device of the smart phone or tablet type data processing system 202 while being in proximity with the physical device or devices. The I/O device may be for example a camera 234, a GPS device 238, a short range wireless communication subsystem 224 or any other appropriate I/O device. The information can include a unique identifier, an image of the device, radio frequency (RF) identification information, a physical location, etc. Additionally, the application overlay module 310 overlays this information about the physical device with conditions using imaging captured through a camera, such as camera 234 of the smart phone or tablet type data processing system 202.

The conditions examination facilitation module 150 also includes a display module 320 which displays the information about the conditions along with the associated physical systems via a display of the tablet type or smart phone type computing device. In certain embodiments, the imaging can be in real time. The conditions examination facilitation module 150 also receives conditions information about a device from a device conditions information module 330. The conditions information can include information regarding applications executing on the device, I/O health information such as current connection information (e.g., to and from internet protocol (IP) addresses) and connection transfer rates, users presently operating on the physical device as well as diagnostics information generated by any diagnostics tools associated with the physical device.

When an IT support personnel is actually viewing a device or a plurality of devices within a data center, an image of the device or devices is easily obtained and displayed via the display device along with information about the conditions of the physical systems being viewed, with the overlay of the information displayed. The combination of the image of the physical device along with the information about the conditions of the physical systems is referred to as an augmented reality of the physical systems. Thus, the IT support personnel can approach a physical device or a plurality of physical devices and obtain detailed information about the physical system and conditions.

Figure 4:
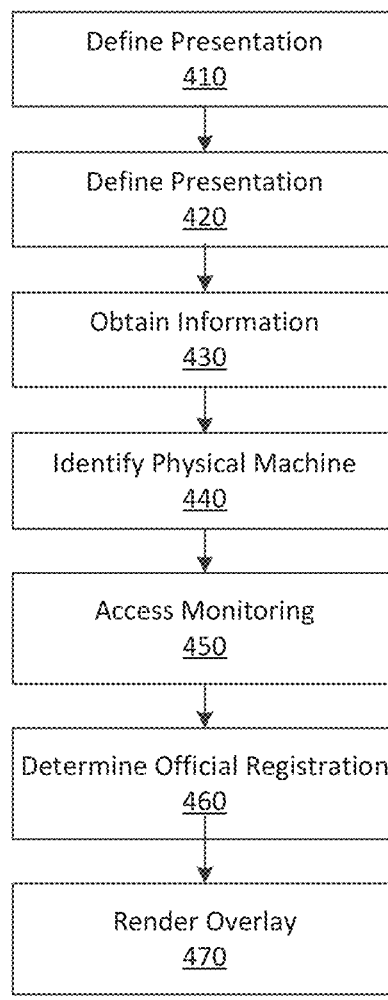
FIG. 4 shows a flow chart of the operation of a system for facilitating examination of conditions across physical machines using augmented reality.
Figure 5:
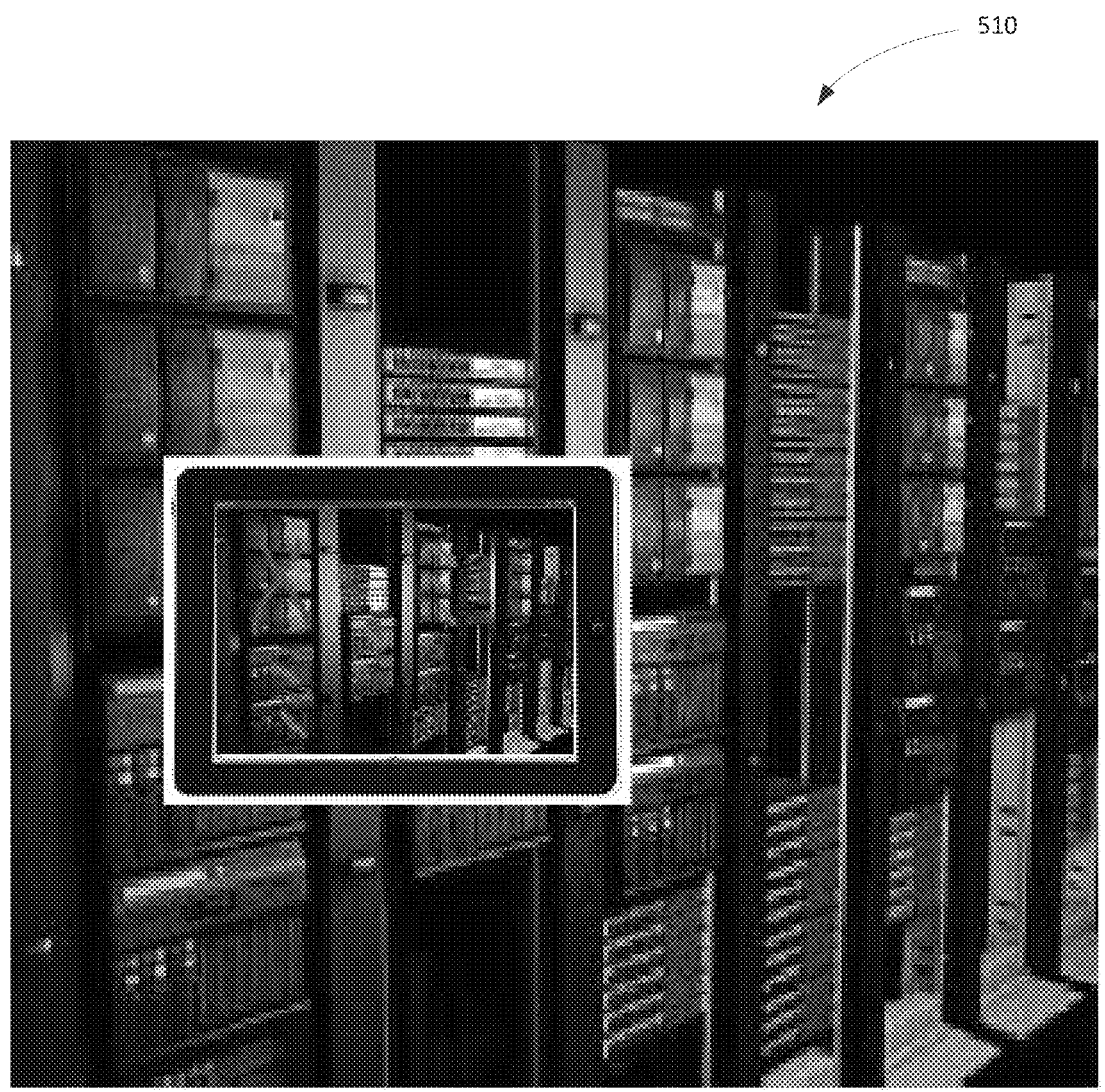
FIG. 5 shows an exemplative diagrammatic view of a representation generated by a system for facilitating examination of conditions across physical machines using augmented reality.

Referring to FIG. 4, a flow chart of the operation of conditions examination facilitation module 150 is shown. More specifically, the conditions examination facilitation module 150 starts operation at step 410 by defining presentation of the software stacks that are currently executing on the physical hardware in a virtualized and/or cloud computing environment. Next, at step 420, the conditions examination facilitation module 150 defines presentation of information regarding a physical installed hardware environment. Next, at step 430, the conditions examination facilitation module 150 captures, via a camera associated with the data processing system images of the physical devices to which the camera is directed. In certain embodiments, the image capture may be substantially continuous. Next, at step 440, the conditions examination facilitation module 150 identifies the physical machine being viewed via an identifier (ID) of the physical device, or a quick response (QR) type code which is visible on the physical machine. Next, at step 450, the conditions examination facilitation module 150 accesses monitoring software, and obtains data about the status of the physical device, the applications executing on the physical device, and the status of those applications. Next, at step 460, in certain embodiments, the conditions examination facilitation module 150 determines whether the physical device being viewed is an officially registered end point of the data center pool of assets so that the information associated with the physical device can be obtained regarding internal software stacks. Next, at step 470, the conditions examination facilitation module 150 uses this information to render an overlay over the image of whatever is being observed via the data processing system and displays the data that was obtained Referring to FIG. 5, an exemplative diagrammatic view of a data center along with an overlayed rendering of the data center is shown. More specifically, a tablet type data processing system 102 obtains an image of physical devices located within a data center 510. The conditions examination facilitation module 150 provides an overlayed rendering of the data center.

It will be apparent to skilled practitioners of the art that many such combinations are possible to provide the processing of transactions and the foregoing is not intended to limit the spirit, scope, or intent of the disclosure.

Having thus described the disclosure of the present application in detail and by reference to preferred embodiments thereof, it will be apparent that modifications and variations are possible without departing from the scope of the disclosure defined in the appended claims.

What is claimed is:

1. A system comprising:
a processor;
a data bus coupled to the processor; and
a computer-usable medium embodying computer program code, the computer-usable medium being coupled to the data bus, the computer program code comprising instructions executable by the processor and configured for:
defining presentation of software stacks executing on physical hardware in a data processing system environment;
defining presentation of information regarding a physical installed hardware environment of the data processing system environment;
obtaining information in real time about the physical hardware in the data processing system environment while in proximity with the physical hardware;
identifying the physical hardware based upon the information about the physical hardware;
obtaining condition information regarding physical hardware based upon the identifying; and,
overlaying the condition information with images of the physical hardware, the condition information comprising information associated with the physical device regarding the software stacks executing on the physical hardware.

2. The system of claim 1, wherein
the identifying is based upon at least one of an identifier (ID) of the physical device and a quick response (QR) type code of the physical device, the at least one of the ID of the physical device and the QR type code of the physical device being visible on the physical machine.

3. The system of claim 1, wherein
the condition information comprises at least one of information regarding applications executing on the physical device, input/output health information, users presently operating on the physical device and diagnostics information generated by any diagnostics tools associated with the physical device.

4. The system of claim 3, wherein
the condition information is obtained from monitoring software, the monitoring software monitoring operation of the physical hardware.

5. The system of claim 1, wherein
the physical hardware comprises an officially registered end point of a data center pool of assets.

6. A non-transitory computer-usable medium embodying computer program code, the computer program code comprising computer executable instructions configured for:
defining presentation of software stacks executing on physical hardware in a data processing system environment;
defining presentation of information regarding a physical installed hardware environment of the data processing system environment;
obtaining information in real time about the physical hardware in the data processing system environment while in proximity with the physical hardware;
identifying the physical hardware based upon the information about the physical hardware;
obtaining condition information regarding physical hardware based upon the identifying; and,
overlaying the condition information with images of the physical hardware, the condition information comprising information associated with the physical device regarding the software stacks executing on the physical hardware.

7. The non-transitory computer-usable medium of claim 6, wherein:
the identifying is based upon at least one of an identifier (ID) of the physical device and a quick response (QR) type code of the physical device, the at least one of the ID of the physical device and the QR type code of the physical device being visible on the physical machine.

8. The non-transitory computer-usable medium of claim 6, wherein
the conditions information comprises at least one of information regarding applications executing on the physical device, input/output health information, users presently operating on the physical device and diagnostics information generated by any diagnostics tools associated with the physical device.

9. The non-transitory computer-usable medium of claim 8, wherein
the condition information is obtain from monitoring software, the monitoring software monitoring operation of the physical hardware.

10. The non-transitory computer-usable medium of claim 6, wherein
the physical hardware comprises an officially registered end point of a data center pool of assets.

* * * * *